US008743661B2

(12) United States Patent
Howell et al.

(10) Patent No.: US 8,743,661 B2
(45) Date of Patent: Jun. 3, 2014

(54) TIMING TAG

(75) Inventors: Daniel R. Howell, Newburgh, IN (US); Shawna L. Bardo, Salem, OH (US)

(73) Assignee: Chronotrack Systems, Corp., Chanhassen, MN (US)

(*) Notice: Subject to any disclaimer, the term of this patent is extended or adjusted under 35 U.S.C. 154(b) by 829 days.

(21) Appl. No.: 12/553,369

(22) Filed: Sep. 3, 2009

(65) Prior Publication Data

US 2010/0302910 A1 Dec. 2, 2010

Related U.S. Application Data

(60) Provisional application No. 61/182,512, filed on May 29, 2009.

(51) Int. Cl.
*G04B 47/00* (2006.01)
*G06K 19/06* (2006.01)
*A63B 24/00* (2006.01)
*G06K 19/077* (2006.01)
*A43B 3/00* (2006.01)

(52) U.S. Cl.
CPC .... *G06K 19/07749* (2013.01); *G06K 19/07786* (2013.01); *A43B 3/0005* (2013.01); *A63B 24/0062* (2013.01); *A63B 2220/836* (2013.01); *A63B 2225/54* (2013.01)
USPC ....... 368/10; 368/113; 340/572.7; 340/572.8; 343/718

(58) Field of Classification Search
CPC ............. G04B 47/00; G06K 19/07749; G06K 19/07786; A43B 3/0005; A63B 2220/836; A63B 2225/54
USPC .......... 368/10; 342/10.1, 572.1, 572.7, 572.8; 340/10.1, 572.1, 572.7, 572.8; 343/718
See application file for complete search history.

(56) References Cited

U.S. PATENT DOCUMENTS 4,198,772 A * 4/1980 Furutu ............................ 40/665
4,783,917 A * 11/1988 Smith et al. .................... 40/633

(Continued)

FOREIGN PATENT DOCUMENTS

EP 2009595 * 12/2008

OTHER PUBLICATIONS http://www.runbulldogrun.com/kale-running/kalerunning-announce-chronotrack-timing-system-acquisition/ ; Aug. 21, 2008.*

(Continued)

*Primary Examiner* — Vit W Miska
(74) *Attorney, Agent, or Firm* — C. Richard Martin

(57) ABSTRACT

A disposable timing tag is provided, including a thin, flexible planar sheet member having first and second end sections, and a middle section. A printed radio frequency identification (RFID) circuit is disposed on the middle section thereof and includes an integrated circuit chip, and a dipole antenna electrically coupled thereto. The dipoles of antenna extend generally along the longitudinal axis of the sheet member toward the first and second respective end sections thereof. The first and second end sections of the flexible planar member are separated from the middle section by fold lines formed in the surface of the planar member extending across the horizontal axis thereof, and the planar sheet member is folded such that the first and second ends thereof are connected to one another and the planar member forms a substantially D-shaped closed loop. The joined first and second ends of the flexible planar member are positioned between said laces and tongue of said athletic shoe and said RFID circuit on said middle section of the flexible planar member is spaced away from the surface of the athletic shoe.

16 Claims, 5 Drawing Sheets

(56) References Cited

U.S. PATENT DOCUMENTS

| | | | |
|---|---|---|---|
| 5,448,846 A * | 9/1995 | Peterson et al. | 40/633 |
| 5,528,222 A * | 6/1996 | Moskowitz et al. | 340/572.7 |
| 6,018,299 A * | 1/2000 | Eberhardt | 340/572.7 |
| 6,100,804 A * | 8/2000 | Brady et al. | 340/572.7 |
| 6,107,920 A * | 8/2000 | Eberhardt et al. | 340/572.7 |
| 6,278,413 B1 | 8/2001 | Hugh et al. | |
| 6,301,197 B1 | 10/2001 | Abbott et al. | |
| 6,518,885 B1 * | 2/2003 | Brady et al. | 340/572.7 |
| 7,042,357 B2 * | 5/2006 | Girvin et al. | 340/568.2 |
| 7,316,358 B2 | 1/2008 | Kotik et al. | |
| 7,405,664 B2 * | 7/2008 | Sakama et al. | 340/572.7 |
| 7,642,918 B2 * | 1/2010 | Kippelen et al. | 340/572.8 |
| 7,724,132 B1 * | 5/2010 | Daniel | 340/539.13 |
| 2003/0009308 A1 * | 1/2003 | Kirtley | 702/141 |
| 2003/0173408 A1 * | 9/2003 | Mosher et al. | 235/492 |
| 2006/0097847 A1 * | 5/2006 | Bervoets et al. | 340/10.1 |
| 2007/0103311 A1 * | 5/2007 | Kippelen et al. | 340/572.8 |
| 2007/0200709 A1 * | 8/2007 | Naim et al. | 340/572.7 |
| 2008/0307685 A1 * | 12/2008 | Ali et al. | 40/633 |
| 2008/0316032 A1 * | 12/2008 | Kia | 340/572.1 |
| 2009/0094872 A1 * | 4/2009 | Ali et al. | 40/633 |
| 2009/0184806 A1 * | 7/2009 | Kia | 340/10.52 |
| 2009/0309735 A1 * | 12/2009 | Lamp | 340/572.8 |
| 2010/0201491 A1 * | 8/2010 | Jacot | 340/10.1 |

OTHER PUBLICATIONS http://www.impinj.com/news-events/release.aspx?id=2087 ; Apr. 2, 2008.* http://www.rfidsolutionsonline.com/article.mvc/Gen-2-RFID-Avery-Dennison-RFID-Inlays-Used-In-0001 ; Dec. 19, 2008.* http://www.chronotrack.com/pdf/D_Tag_Instructions.pdf ; Aug. 20, 2008.*

* cited by examiner

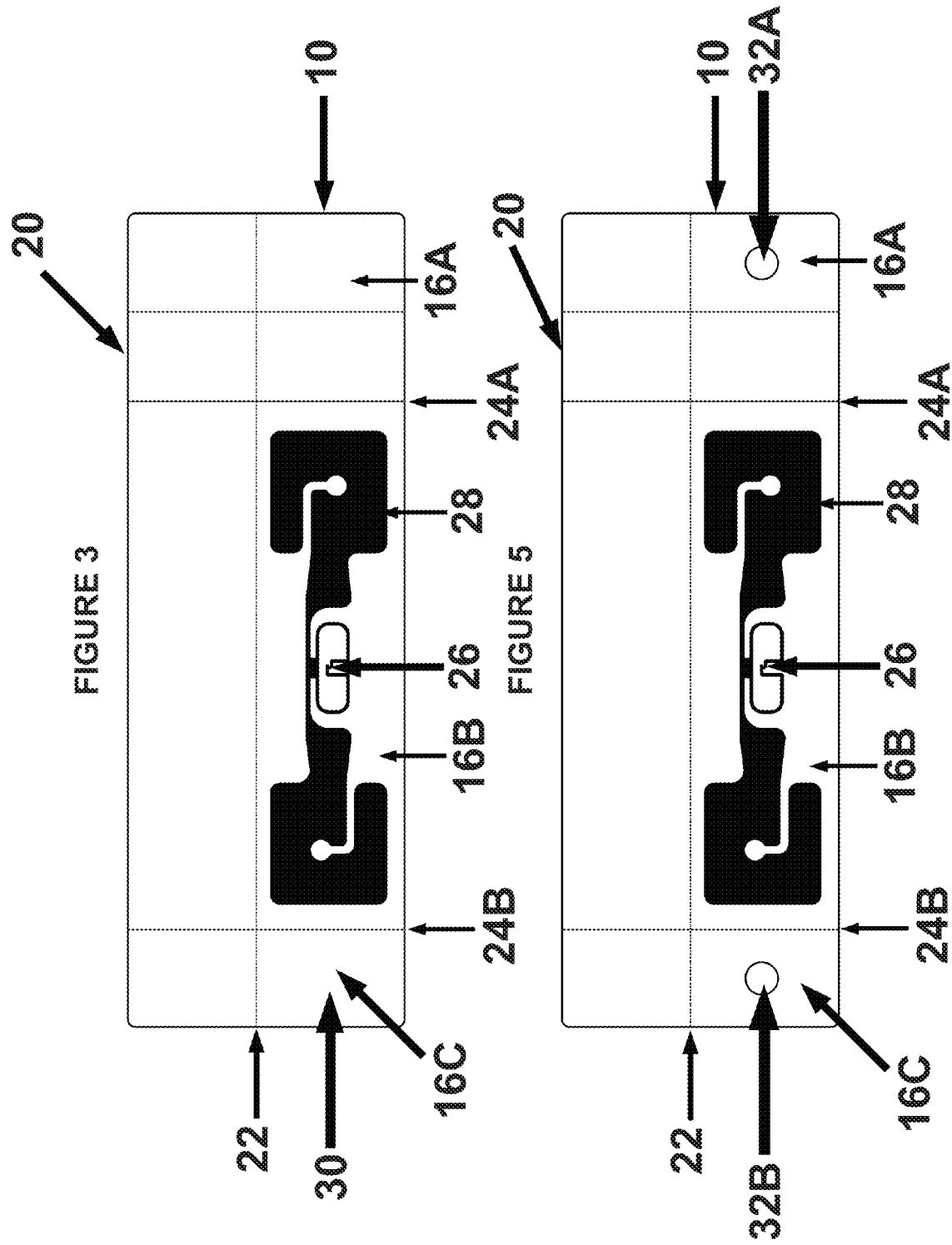

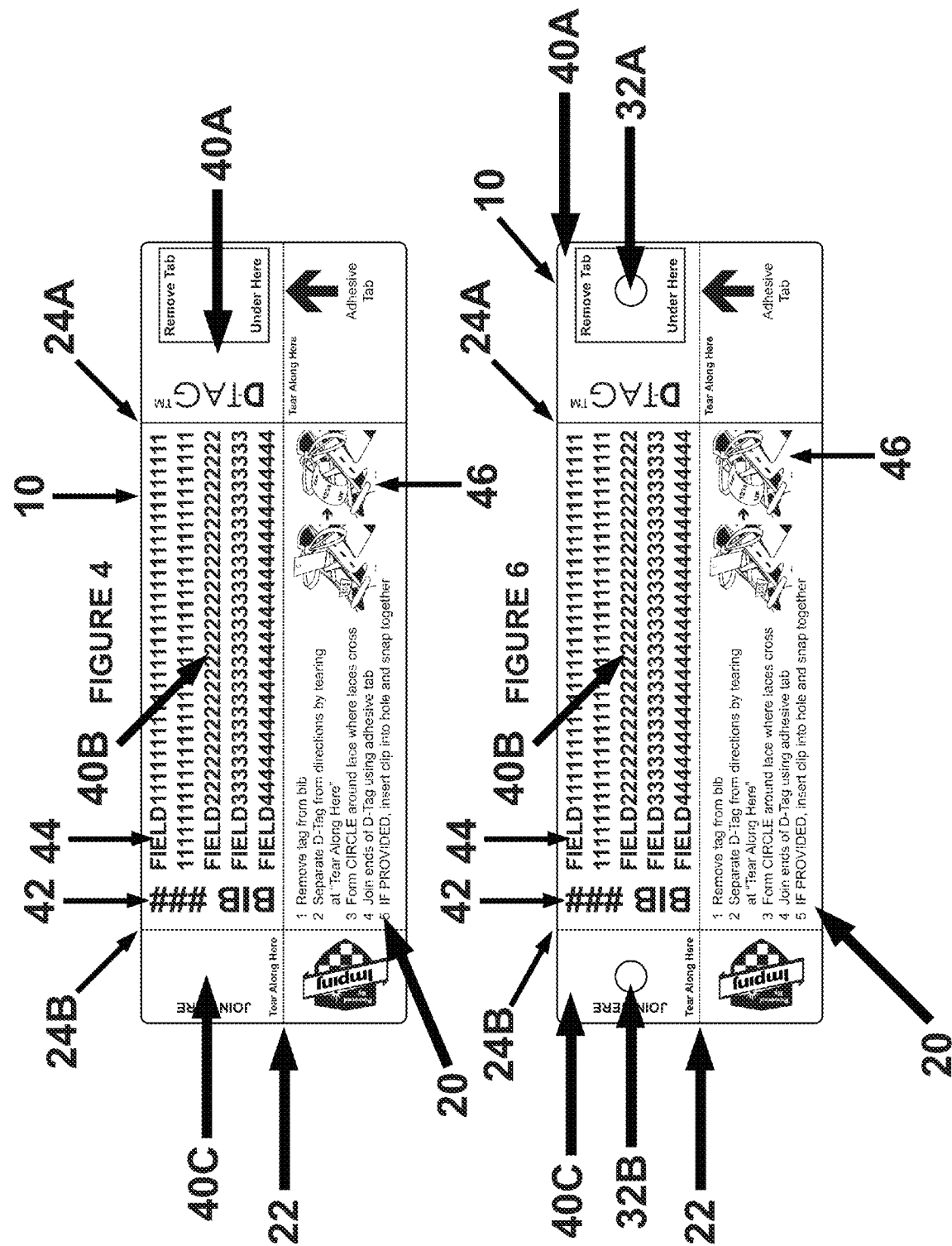

TIMING TAG

FIELD OF THE INVENTION

The invention relates to electronic timing and location devices worn by endurance athletes competing in races, and specifically relates to an improved, disposable UHF RFID tag having a chip upon which data can be encoded for purposes of collecting data on an athlete during a race.

BACKGROUND OF THE INVENTION

The human spirit is competitive. Since earliest times men and women have run and raced against each other. The basic race consists of a start where someone says "GO" and everyone races to the finish line—first one across wins. A stopwatch can be used to determine the winning time.

It is easy to spot the winners—they are at the front, but it is not so simple to determine who is say "$400^{th}$". Today, every runner wants to know how he or she did compared to other runners and to their "personal best" time. They want to know if they are "$400^{th}$" or "$401^{st}$". To know that, an accurate, recorded time needs to be generated for every runner.

In a large race today, there are thousands of runners. Systems need to capture a start-time for every runner and to track when they cross the finish line, then use that data to compute that runner's elapsed time. In long races, runners also want to know what their "split times" are. They want to know what their times were when they crossed certain mile markers during the race. Further sophistication now requires that these times be posted on the internet in real time so that relatives and loved ones can use the runner's number to see when their runner passed these points.

The present invention meets that need with an improved UHF RFID timing tag on the runner's shoe and portable readers connected via the cellular network.

RFID has been used in race timing systems since 1986. Before the present invention, all of these systems used a returnable RFID chip that was attached to the runner and had to be returned to the timer following the race. These systems have significant limitations. First, the timer must build a cross-link file that correlates the unique RFID chip number to the runner's bib number. This process of building this file is time consuming and error prone. Second, after the race, each runner must wait in line to have his or her RFID chip "clipped" and returned to the timer. The event coordinator must ensure that there are sufficient volunteers to collect these RFID chips and there must be a sufficiently large and secure area to support this chip collection. If chips are not returned, the event is liable and must pay the timer for lost chips. In addition, the prior art chips are bulky and expensive to mail, so pre-registration options to improve race starts cost the event money—a not insignificant trade off. Further, the RFID controller on prior art systems is susceptible to electromagnetic interferences and must be tuned. Finally, the prior art chip controller does not have an integrated screen requiring this unit to operate externally with cables, more pieces, more packing and unpacking for the timer.

The present invention overcomes these limitations by providing a system that uses low cost, disposable UHF Gen 2 RFID Tags. The use of this tag eliminates the need for chip assignment, the cost of shipping chips to events or participants, lost chip costs and the need to create a secure zone for chip collection. The elimination of the costs for these processes directly affects the events' and timers' bottom lines. On race day, the timer can now benefit from a system that is over 99.8% accurate, does not have to be tuned, does not suffer from interference from spurious EMI sources, can be powered by its internal Li-ion batteries, external car batteries, AC generators and/or AC socket in the back of a vehicle.

SUMMARY OF THE INVENTION

The present invention provides an all-weather option that is better suited to the logistics and pace of today's style of events. The present invention includes a Gen2UHF RFID tag that is used to track a runner's process during a race. The tag is a disposable plastic strip about the size of a bandage and has a tiny computer chip and antenna embedded in the plastic strip. Data collected from a race event's registration file, such as the runner's name, sex, age, hometown, etc., can be printed on the label portion of the RFID tag using a commercially available Zebra RFID printer. At the same time, the RFID tag is configured and encoded data that uniquely identifies the race and the runner's "bib" number. The RFID tag is then attached to the runner's bib and included in the runner's race packet. These bibs are then either mailed or hand delivered to the runner at the race expo. On race day, the athlete removes the tag from the bib and attached it to the laces of his or her shoe. Because the tag is disposable, following the race, the runner simply removes the tag from his or her shoe and disposes of it.

According to one aspect of the present invention, there is provided a disposable timing tag for attachment to an athletic shoe between laces and a tongue thereof. The timing tag according to this aspect of the invention includes a thin, flexible planar sheet member having a front surface, a rear surface, first and second end sections, and a middle section between said first and second end sections. A printed radio frequency identification (RFID) circuit is disposed on the middle section of one of said front or rear surfaces of the sheet member. The RFID circuit includes an integrated circuit chip positioned near the center of the middle section of the planar sheet member, and a dipole antenna electrically coupled to said integrated circuit chip. A first dipole of the antenna extends generally along a longitudinal axis of the sheet member toward the first end section and a second dipole of the antenna extends generally along the longitudinal axis of the sheet member toward the second end section.

According to a further aspect of the invention, the planar sheet member may be folded such that the first and second ends thereof are connected to one another and the planar member forms a closed loop. According to an alternative aspect of the invention, the first and second end sections of the thin, flexible planar member are separated from the middle section thereof by respective fold lines formed in the surface of the planar member extending across the horizontal axis thereof. The planar sheet member according to this alternative aspect of the invention is folded such that the first and second ends thereof are connected to one another and the planar member forms a substantially D-shaped closed loop. The joined first and second ends of the flexible planar member are positioned between said laces and tongue of the athletic shoe such that the RFID circuit on said middle section of the flexible planar member is spaced away from the surface of the athletic shoe.

According to a further aspect of the invention, the first and second ends of the planar sheet member are connected to one another by an adhesive, that may include a contact adhesive material disposed on a surface of one of said first and second ends such that when the first and second ends are connected to one another, the adhesive material on one of said first or second ends of the flexible sheet member comes into contact with a surface of the other of said first and second ends and secures the first and second ends to one another.

According to yet another aspect of the invention, a clip is provided for removeably securing the first and second ends of the flexible sheet member to one another. According to this aspect, each of the first and second ends of the flexible sheet member includes a hole therethrough. The clip includes a first planar member having a pin protruding from a surface thereof and a second planar member having an end pivotally connected to an end of the first planar member of the clip and having a détente for receiving said pin once it has passed through said holes in said first and second ends of the flexible sheet member.

A further aspect of the invention provides that the first and second dipoles of the antenna extend substantially to the region where said middle section meets the first and second end sections, respectively, such that the dipoles of the antenna extend substantially along the entire length of the middle section of the flexible planar sheet. The width of the first and second dipoles of said antenna may extend substantially across the width of the flexible planar sheet member.

Finally, it is an aspect of the invention to provide a disposable timing tag wherein the RFID circuit is disposed on the rear surface of the sheet member and identification information is printed on the front surface of the sheet member.

Accordingly, it is an object of the present invention to provide a low cost, disposable RFID timing tag that eliminates the need for chip assignment, the cost of shipping chips to events or participants, lost chip costs and the need to create a secure zone for chip collection.

It is a further object of the present invention to provide a disposable timing tag that can accurately record information about multiple athletes at multiple locations.

These and other objects, features and advantages of the present invention will become apparent with reference to the text and the drawings of this application.

BRIEF DESCRIPTION OF THE DRAWINGS

FIG. 3 is a back plan view of an unassembled improved timing tag according to a presently preferred embodiment of the present invention.

FIG. 4 is a front plan view of an unassembled improved timing tag according to a presently preferred embodiment of the present invention.

FIG. 5 is a back plan view of an unassembled improved timing tag according to an alternative preferred embodiment of the present invention.

FIG. 6 is a front plan view of an unassembled improved timing tag according to an alternative preferred embodiment of the present invention.

DETAILED DESCRIPTION OF PREFERRED EMBODIMENTS

Figure 1:
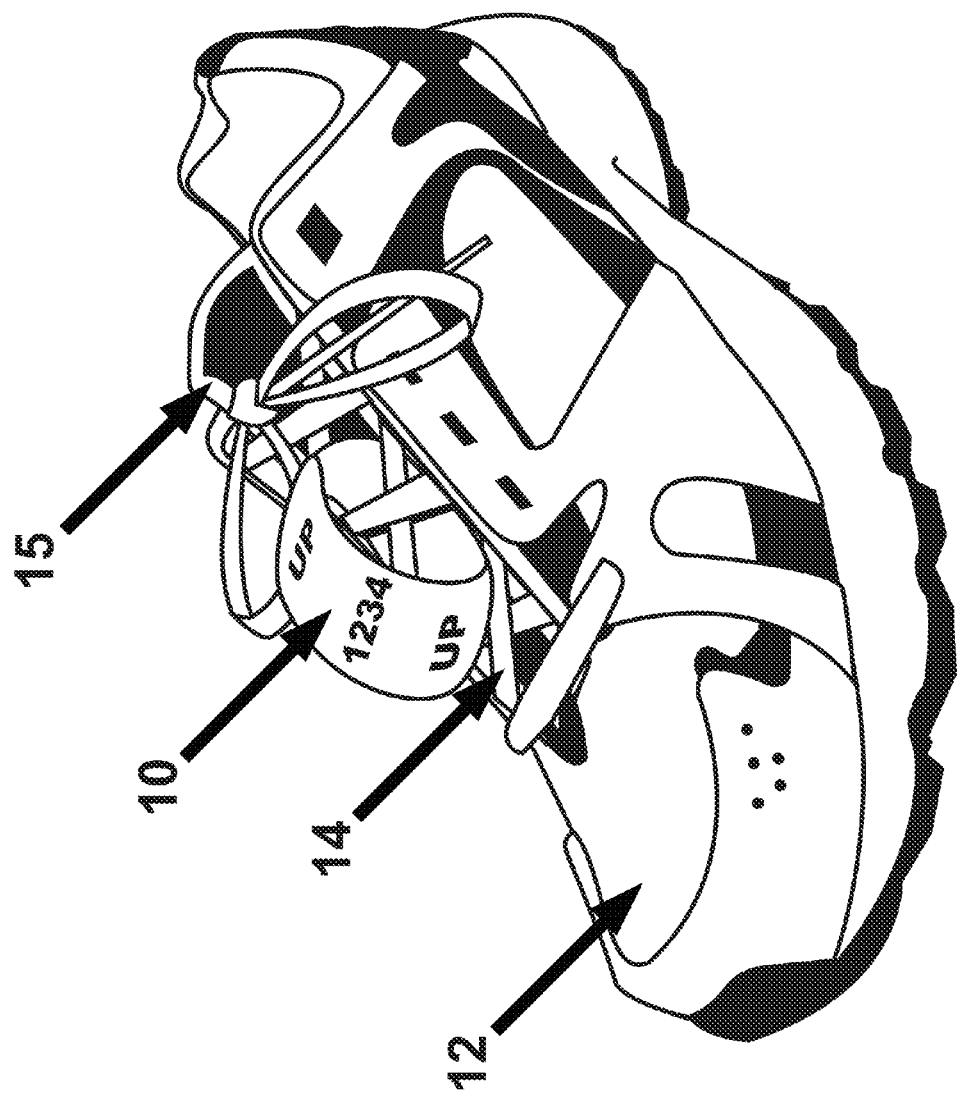
FIG. 1 is a perspective view of an athletic shoe having an assembled improved timing tag according to a presently preferred embodiment of the present invention attached thereto via the laces.

FIGS. 1-4 illustrate an improved timing tag 10 according to a presently preferred embodiment of the present invention. As shown in FIG. 1, the timing tag 10 is preferably attached to an athletic shoe 12 by inserting a portion of the timing tag 10 between the laces 14 and tongue 15 of the athletic shoe 12, such that the tag forms a substantially D-shaped profile. According to the presently preferred embodiment, the timing tag 10 is a planar member, preferably having a substantially rectangular cross-section. Although other dimensions are contemplated, the timing tag according to the preferred embodiment is approximately 1.25 inches (3 cm) wide to permit insertion between the laces 14 and tongue 15 of a common athletic shoe 12, and 6.25 inches (16 cm) long. The timing tag 10 is preferably formed of a flexible, water resistant sheet type material having very low conductivity, such as sheet plastic or laminated paper. The timing tag 10 includes opposing rear and front surfaces 16 and 18, respectively.

As best shown in FIGS. 3 and 4, the planar timing tag 10 of the present invention is removably attached to a disposable planar member 20. A perforation 22 is formed between the timing tag 10 and disposable planar member 20 to allow an athlete to remove and dispose of the disposable planar member 20 prior to assembling the timing tag 10 and placing it on the athletic shoe 12. As best shown in FIG. 3, the rear surface 16 of the timing tag 10 includes three separate sections 16a, 16b, 16c separated by fold lines or creases 24a, 24b extending across the timing tag 10.

An integrated circuit 26 and antenna 28 are formed on the timing tag 10. As shown in FIG. 3, the integrated circuit 26 and antenna 28 are preferably formed on the rear surface 16 of the timing tap 10 for aesthetic reasons and to protect those components from the elements. It is also contemplated that the integrated circuit and/or antenna be formed on the front surface 18 of the timing tag 10. The integrated circuit 26 is used for storing and processing information, modulating and demodulating a radio-frequency (RF) signal and other specialized functions. The integrated circuit 26 includes memory circuits and logic circuits. The logic circuits store, retrieve, and manipulate data that is encoded into the memory circuits. The logic circuits of the integrated circuit 26 receive and transmit data externally from the timing tag 10 via RF signals. The timing tag is preferably a passive RFID tag, which has no battery and requires an external source to provoke signal transmission. Alternatively, the timing tag 10 could be an active RFID tag, which contains a battery and can transmit signals autonomously.

The antenna 28 is electrically connected to the integrated circuit 26 and is configured for receiving and transmitting the signal. The antenna 28 picks up signals from an RFID reader or scanner and then returns the signal, with some additional data—in this case, the runner's bib number and related information that has previously been encoded on the memory circuits of the integrated circuit 26. The antenna 28 is a conductive element that permits the timing tag 10 to exchange data with a remote reader. The antenna array is large relative to the surface of the timing tag to permit the data to be read at a distance from the transmitting antenna.

Passive RFID tags, such as are contemplated in the preferred embodiment of the present invention, make use of a coiled antenna that can create a magnetic field using the energy provided by the reader's carrier signal. A passive tag does not contain a battery; the power is supplied by the reader. When radio waves from the reader are encountered by a passive RFID tag, the coiled antenna within the tag forms a magnetic field. The tag draws power from it, energizing the circuits in the tag. The tag then sends the information encoded in the tag's memory to the reader.

The integrated circuit 26 and antenna 28 comprise a singular structure with a printed RFID circuit, thereby minimizing its profile and weight. According to one preferred embodiment of the invention shown in FIGS. 3 and 5, a DogBone RFID tag manufactured by UPM Raflatac is utilized. The integrated circuit used is EPC Class 1 Gen 2 compliant and 96 bit EPC memory is provided. The integrated circuit operates at a frequency of 860-960 MHz. The antenna measures approximately 93×23 mm. Other antenna configurations and integrated circuits may be used in keeping with the spirit of the invention.

Figure 2:
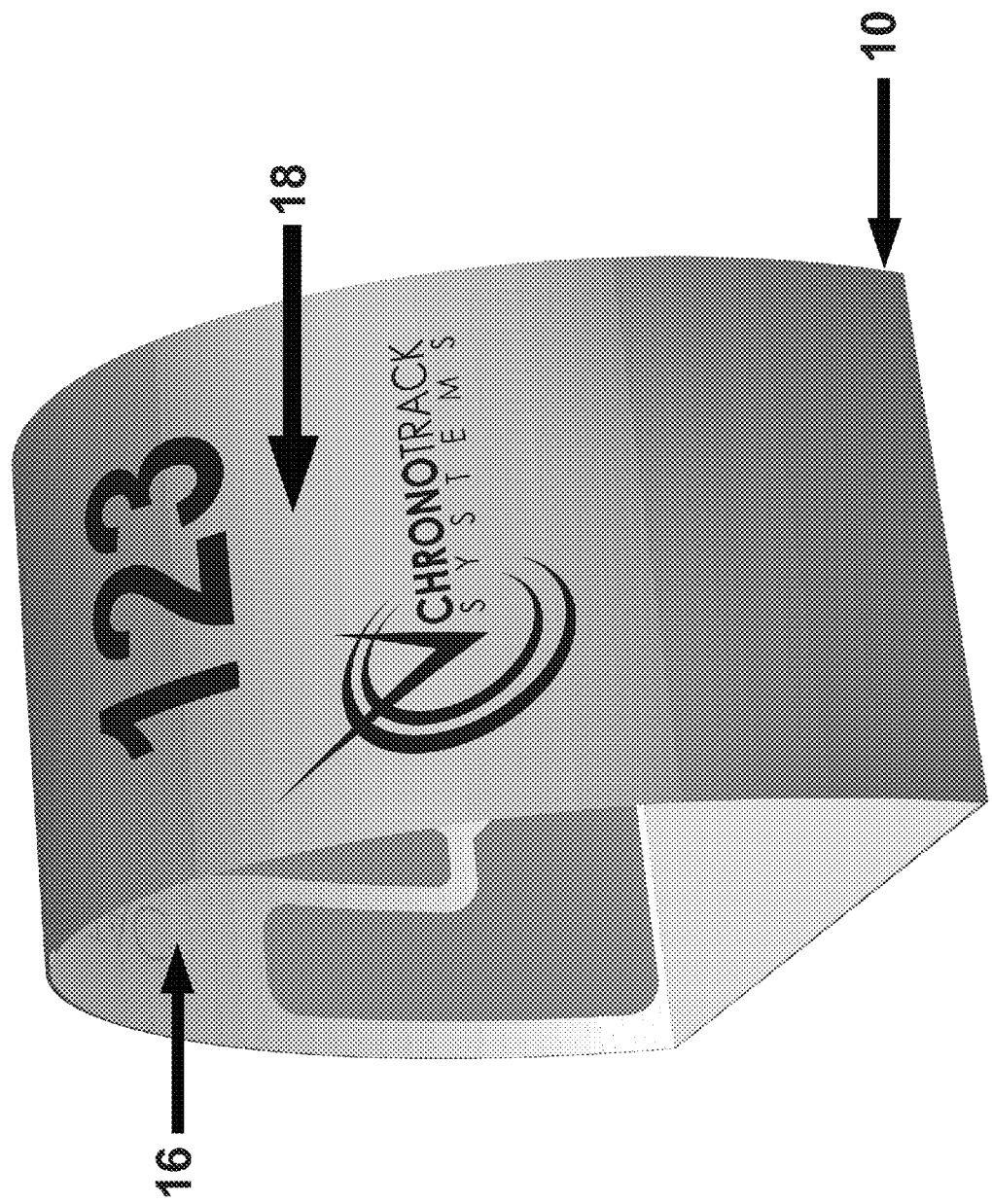
FIG. 2 is a perspective view of an assembled improved timing tag according to a presently preferred embodiment of the present invention.
Figure 7:
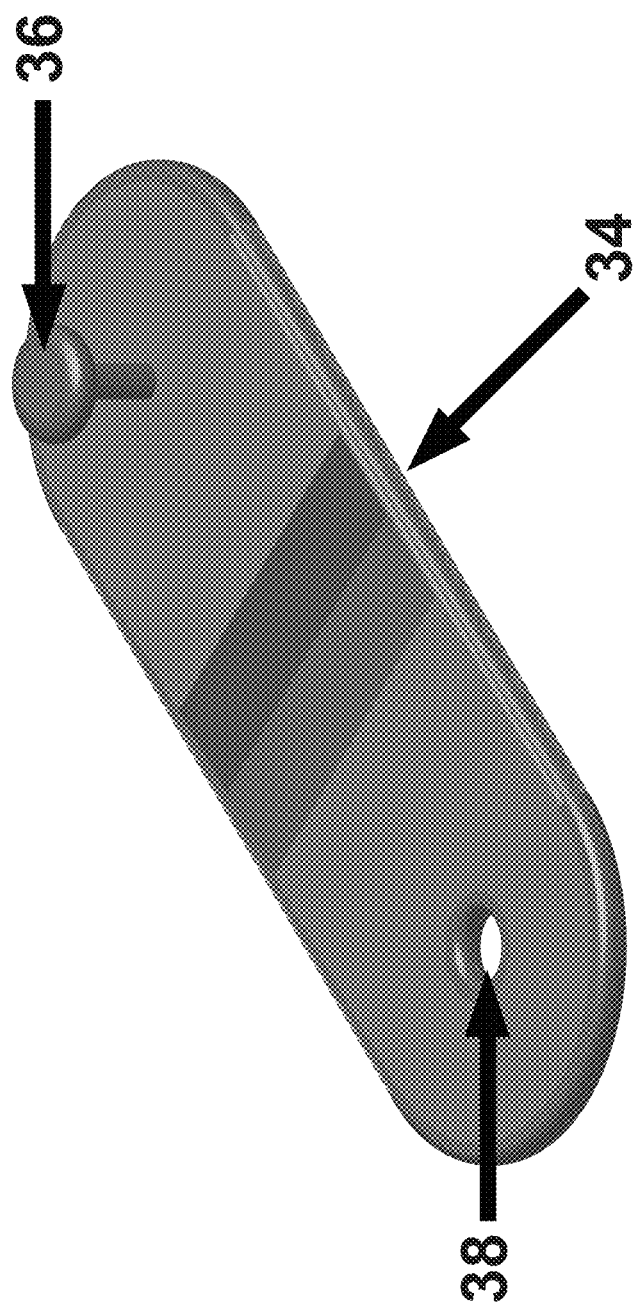
FIG. 7 is a perspective view of a retaining clip for use in conjunction with the improved timing tag shown in FIGS. 5 and 6.

It has been discovered through testing that the RFID tag does not operate to its potential when the integrated circuit and antenna are allowed to come in contact with moisture and heat that may be present on the surface of the athletic shoe. Thus, in order for the RFID tag to operate properly, in use as a timing tag, it is necessary to separate the integrated circuit 26 and antenna 28 from the surface of the athletic shoe 12. This is accomplished by folding the timing tag 10 to form a closed loop having a substantially D-shaped profile, as best shown in FIGS. 1 and 2. Shapes other than a D-shape are contemplated, so long as the loop permits the timing tag to be attached to the athletic shoe and separates the antenna and integrated circuit from the surface of the shoe. As shown in FIG. 3, a pressure sensitive adhesive 30 may be provided on the third section 16c of the rear surface 16 of the timing tag. Alternatively, as shown in FIGS. 5-7, the first and second end sections 16a, 16c, respectively, may be removably secured to one another by openings 32a, 32b formed in the respective end sections 16a, 16b, and a clip 34 having a pin 36 and clasp 38 may be used where the pin 36 is passed through holes 32a, 32b and inserted into clasp 38 to removably secure the first and second end sections 16a, 16b of the timing tag to one another.

As shown in FIGS. 4 and 6, the front surface 40 of the timing tag 10 is also separated into three sections 40a, 40b, 40c by fold lines or creases 24a, 24b. The center section 40b of the front surface may carry identifying information printed on the surface thereof, such as the runner's bib number 42 and other machine generated data 44 such as symbols, trademarks, advertisement, instructions, and additional runner information. Likewise, the disposable portion 20 of the timing tag 10 may carry such identifying information 46 on the surface thereof.

The timing tag is assembled by first removing the disposable portion 20 by tearing along perforation 22 and discarding the disposable portion 20. One end of the timing tag is then inserted between the laces 14 and tongue 15 of the athletic shoe 12. Sharper creases are then formed at the fold lines or creases 24a, 24b. The ends 16a, 16c of the timing tag 10 are then secured to one another, by either the pressure sensitive adhesive shown in FIG. 3 or by the clip 34 and openings 32a, 32b shown in FIGS. 5-7. The joined end portions 16a, 16c are then positioned between the laces 14 and tongue 15 of the athletic shoe 12. Because of the resiliency of the plastic sheeting material, such a configuration results in the assembled timing tag 10 having a substantially D-shaped profile resulting in the RFID circuit containing the integrated circuit 26 and antenna 28 being effectively separated a distance from the surface of the athletic shoe.

The foregoing is provided for purposes of illustrating, explaining, and describing embodiments of the present invention. The specific components and order of the steps listed above, while preferred is not necessarily required. Further modifications and adaptation to these embodiments will be apparent to those skilled in the art and may be made without departing from the scope or spirit of the invention.

The invention claimed is:

1. A disposable timing tag for attachment to an athletic shoe between laces and a tongue thereof comprising:
   a thin, flexible planar sheet member having a front surface, a rear surface, first and second end sections, and a middle section between said first and second end sections, wherein said planar sheet member may be folded such that the first and second ends thereof are connected to one another and the planar member forms a closed loop;
   a printed radio frequency identification (RFID) circuit disposed on the middle section of one of said front or rear surfaces of the sheet member, said RFID circuit including an integrated circuit chip positioned near the center of the middle section of the planar sheet member, and a dipole antenna electrically coupled to said integrated circuit chip, wherein a first dipole of the antenna extends generally along a longitudinal axis of the sheet member toward the first end section and a second dipole of the antenna extends generally along the longitudinal axis of the sheet member toward the second end section.

2. The disposable timing tag according to claim 1 wherein the joined first and second ends of the flexible planar member are positioned between said laces and tongue of said athletic shoe and said RFID circuit on said middle section of the flexible planar member is spaced away from the surface of the athletic shoe.

3. The disposable timing tag according to claim 1 wherein the first and second ends of the planar sheet member are connected to one another by an adhesive.

4. The disposable timing tag according to claim 3, further comprising a contact adhesive material disposed on a surface of one of said first and second ends such that when the first and second ends are connected to one another, the adhesive material on one of said first or second ends of the flexible sheet member comes into contact with a surface of the other of said first and second ends and secures said first end and said second end to one another.

5. The disposable timing tag according to claim 1 further comprising a clip for removeably securing said first and second ends of the flexible sheet member to one another.

6. The disposable timing tag according to claim 5, wherein each of said first and second ends of the flexible sheet member includes a hole therethrough and said clip includes a first planar member having a pin protruding from a surface thereof and a second planar member having an end pivotally connected to an end of the first planar member of the clip and said second planar member of said clip having a détente for receiving said pin once it has passed through said holes in said first and second ends of the flexible sheet member.

7. The disposable timing tag according to claim 1, wherein the first and second end sections of the thin, flexible planar member are separated from the middle section thereof by respective fold lines formed in the surface of the planar member extending across the horizontal axis thereof.

8. The disposable timing tag according to claim 7, wherein the planar sheet member is folded such that the first and second ends thereof are connected to one another and the planar member forms a substantially D-shaped closed loop.

9. The disposable timing tag according to claim 8, wherein the joined first and second ends of the flexible planar member are positioned between said laces and tongue of said athletic shoe and said RFID circuit on said middle section of the flexible planar member is spaced away from the surface of the athletic shoe.

10. The disposable timing tag according to claim 7, wherein the first and second ends of the planar sheet member are connected to one another by an adhesive.

11. The disposable timing tag according to claim 10, further comprising a contact adhesive material disposed on a surface of one of said first and second ends such that when the first and second ends are connected to one another, the adhesive material on one of said first or second ends of the flexible sheet member comes into contact with a surface of the other of said first and second ends and secures said first end and said second end to one another.

12. The disposable timing tag according to claim 7, further comprising a clip for removeably securing said first and second ends of the flexible sheet member to one another.

13. The disposable timing tag according to claim 12, wherein each of said first and second ends of the flexible sheet member includes a hole therethrough and said clip includes a first planar member having a pin protruding from a surface thereof and a second planar member having an end pivotally connected to an end of the first planar member of the clip and said second planar member of said clip having a détente for receiving said pin once it has passed through said holes in said first and second ends of the flexible sheet member.

14. The disposable timing tag according to claim 1, wherein the first and second dipoles of the antenna extend substantially to the region where said middle section meets the first and second end sections, respectively, such that the dipoles of the antenna extend substantially along the entire length of the middle section of the flexible planar sheet.

15. The disposable timing tag according to claim 14, wherein the width of the first and second dipoles of said antenna extend substantially across the width of the flexible planar sheet member.

16. The disposable timing tag according to claim 1, wherein the RFID circuit is disposed on the rear surface of the sheet member and identification information is printed on the front surface of the sheet member.

* * * * *